United States Patent [19]

Meyer

[11] 4,352,769

[45] Oct. 5, 1982

[54] METHOD FOR SIMULTANEOUSLY MOLDING A PLURALITY OF PRODUCTS

[75] Inventor: Leonard S. Meyer, Columbia, S.C.

[73] Assignee: Victor United, Inc., Chicago, Ill.

[21] Appl. No.: 249,423

[22] Filed: Mar. 31, 1981

Related U.S. Application Data

[62] Division of Ser. No. 153,217, May 27, 1980.

[51] Int. Cl.³ .......................... B29D 3/02; B29G 7/00
[52] U.S. Cl. ..................... 264/134; 156/174; 156/180; 156/250; 264/26; 264/137; 264/157; 264/285
[58] Field of Search ............... 156/173, 175, 242, 245, 156/250, 174, 180, 193, 194, 272, 273; 264/134, 136, 138, 137, 157, 25, 26, 285

[56] References Cited

U.S. PATENT DOCUMENTS

| | | | |
|---|---|---|---|
| 1,907,492 | 5/1933 | Brewster | 156/174 |
| 2,238,216 | 4/1941 | Eger | 156/245 |
| 2,980,158 | 4/1961 | Meyer | 156/175 |
| 3,056,167 | 10/1962 | Knoppel | 156/500 |
| 3,057,767 | 10/1962 | Kaplan | 264/157 |
| 3,080,268 | 3/1963 | Bjork | 264/157 |
| 3,142,598 | 7/1964 | Rosen | 156/174 |
| 3,472,718 | 10/1969 | Siegmund | 156/174 |
| 3,629,041 | 12/1971 | Shobert | 156/289 |
| 3,655,321 | 4/1972 | Wolf | 425/116 |
| 3,870,579 | 3/1975 | Uncapher | 156/174 |
| 3,929,554 | 12/1975 | Kiezebrink | 156/446 |
| 3,963,185 | 6/1976 | Quirk | 156/446 |
| 3,988,089 | 10/1976 | Hampshire | 425/90 |
| 4,062,717 | 12/1977 | McClean | 156/443 |
| 4,125,423 | 11/1978 | Goldsworthy | 156/175 |

Primary Examiner—Willard E. Hoag
Attorney, Agent, or Firm—Emory L. Groff, Jr.

[57] ABSTRACT

A plurality of reinforced plastic parts are simultaneously molded from separate bundles of resin impregnated strands wound about individual frame sections of a substantially planar frame assembly. A loading station includes a dual-acting elongated carrier engaging the multi-sectioned frame assembly and initially rotatable to wind the bundle of strands thereon. Subsequent reciprocation of the carrier delivers the wound frame assembly to a molding station provided with a plurality of mating pairs of mold sections and having displaceable frame supporting and bundle clamping assemblies for engaging the wound frame assembly and severing opposite ends of the bundles as the mold sections close within the individual frame sections. Upon opening of the mold sections, molded parts and the empty frame assembly are subsequently shuttled from the molding station by a removal station provided with a reciprocating elongated carrier axially aligned with the center line of the molding station and the loading station carrier. Acceleration of the molding cycle may be achieved by pre-heating of the wound bundles intermediate the loading and molding stations.

9 Claims, 9 Drawing Figures

METHOD FOR SIMULTANEOUSLY MOLDING A PLURALITY OF PRODUCTS

This is a division of application Ser. No. 153,217, filed May 27, 1980.

This invention relates generally to the formation of molded parts and more particularly to an improved method and apparatus providing a multi-sectional frame assembly with a plurality of wound bundles of resin impregnated fibers which are subsequently delivered to a molding station for simultaneous molding of a plurality of individual parts all of which are concurrently automatically removed therefrom.

Improvements are constantly being sought to enhance the efficiency of the manufacture of molded parts produced from reinforced plastic compositions. Desirable goals in this area include not only the improvement of the quality of the end part but also flexibility as to variation of size or configuration thereof. Of course, a paramount consideration is to increase the speed of production per cycle of any molding apparatus. The molding of parts by utilizing resin impregnated strands of a reinforcing material such as glass fiber has long been recognized as a feasible procedure in the production of elongated parts. U.S. Pat. No. 2,980,158 issued Apr. 18, 1961 to the inventor of the present invention will serve as an example of a method and apparatus wherein strands, comprising resin impregnated glass fibers, are wound upon a rack or frame and subsequently subjected to heat and pressure between cooperating mold sections to produce an end product comprising an elongated member of irregular longitudinal configuration.

The instant invention serves as a significant improvement over methods and apparatus heretofore known and is especially adapted to the manufacture of elongated parts which in cross section may comprise any one of many types of configurations such as circular, oval, channel, rectangular or flat configurations and which usually exhibit a longitudinal extent substantially greater than the transverse dimensions. When viewed in top horizontal plan the product preferably exhibits a straight axis but may include, when viewed in a side vertical elevation, a configuration defining a simple curve, compound curve or irregular curve. Well known products which find particular merit when produced according to the present invention may include archery bows having either a simple, recurve or compound bow configuration, tool handles and leaf springs the latter of which may be substituted for the more conventional metal leaf springs as utilized, for example, in lightweight vehicles such as a camper trailer or other recreational vehicles.

The formation of molded products by the use of impregnated reinforcing strands has often presented considerable difficulties. The placement of individual impregnated strands within a mold cavity obviously would be an extremely time-consumming inefficient procedure. The referenced U.S. Pat. No. 2,980,158 offered an accelerated, more efficient procedure yet still falls far short of providing an automated, high-yield system since much is required in the way of man-power to wind a strand of impregnated fibers about a rack until the desired mass is achieved, following which, the wound frame must be hand positioned within a mold for the final curing step.

By the present invention, an improved method and apparatus is proposed for the simultaneous formation of a plurality of molded elongated-shaped members which are produced from a plurality of wound bundles of impregnated parallel fibers carried by a unitary frame assembly which is intermittently advanced from a winding and loading station to a molding station and thereafter, removed therefrom along with the plurality of simultaneously molded parts. The instant arrangement employs a shuttle concept wherein a multi-sectioned frame assembly is sequentially shuttled from an initial station to each one of a plurality of serially aligned additional stations with the raw material being wound upon and supported by the frame assembly at the beginning of the process and ultimately being retracted from the mold station as a cured product along with the frame assembly.

The resultant molded products according to this invention have been found to be greatly improved as to uniformity due to the inclusion of the frame assembly which allows of carefully controlled winding of strands of impregnated reinforcement and a unique advancing and removal mechanism for shifting the frame assembly to and from a molding station together with supporting and clamping mechanisms associated with the molding station to accurately spot and retain a loaded frame assembly therein.

With the improved sequentially operating stations of this invention it will be appreciated that while a plurality of parts are being simultaneously molded in the molding station another frame assembly may be wound with a plurality of impregnated glass fiber bundles such that upon completion of each cycle of the molding station, those cured parts may be instantly removed from one end of the mold station and immediately another loaded or wound frame assembly may be advanced through the opposite end of the mold station preparatory to initiation of another curing cycle in the molding station. As will be well known to those skilled in the art, the time required for the actual molding and curing cycle in a reinforced resin operation usually is considerably longer than the amount of time required for operation of the other stations in the overall apparatus and the output of the present apparatus is enhanced not only due to the fact that the plurality of parts are molded simultaneously but also because an additional frame assembly may be prepared for insertion within the molding station at the same time the molding station is operating upon a previously inserted frame assembly.

The elapsed time for operation of the molding and curing cycle may be reduced further by subjecting the wound frame assembly to any suitable pre-heating means such as exposure to a radio frequency (RF) field, immediately prior to delivery to the molding station.

Accordingly, one of the objects of the present invention is to provide an improved method for simultaneously molding a plurality of parts carried by a unitary frame assembly having a plurality of sections each with a bundle of longitudinally extending impregnated fibers.

Another object of the present invention is to provide an improved apparatus for simultaneously molding a plurality of parts including a winding and loading station adapted to support a frame assembly having a plurality of substantially planar frame sections each carrying a separate bundle of impregnated fibers and which is shiftable as a unit to a molding station having supporting and clamping means for retaining same during the molding operation.

Still another object of the present invention is to provide an improved apparatus for simultaneously molding a plurality of parts including a molding station for receiving a multi-section frame assembly having wound bundles of impregnated fibers with means in the molding station for engaging, clamping and releasing the ends of the frame assembly as well as for relaxing the wound bundles during operation of the molding station cycle.

A further object of the present invention is to provide an improved apparatus for simultaneously molding a plurality of parts including a loading station having a reciprocating carrier for delivering a material-containing frame assembly to a molding station with the frame assembly including means also receiving a separate reciprocating carrier of a removal station for subsequently removing the frame assembly and molded parts from the molding station.

Another object of the present invention is to provide an improved apparatus for simultaneously molding a plurality of parts including a substantially planar frame assembly containing a continuously wound bundle of impregnated fibers defining upper and lower segments on the frame assembly and means within a molding station engageably with the ends of the frame assembly for rigidly clamping the frame assembly therein while cutting means sever the upper and lower segments prior to molding thereof.

With these and other objects in view which will more readily appear as the nature of the invention is better understood, the invention consists in the novel construction, combination and arrangement of parts hereinafter more fully described, illustrated and claimed.

Similar reference characters designate corresponding parts throughout the several views of the drawings.

Figure 1:
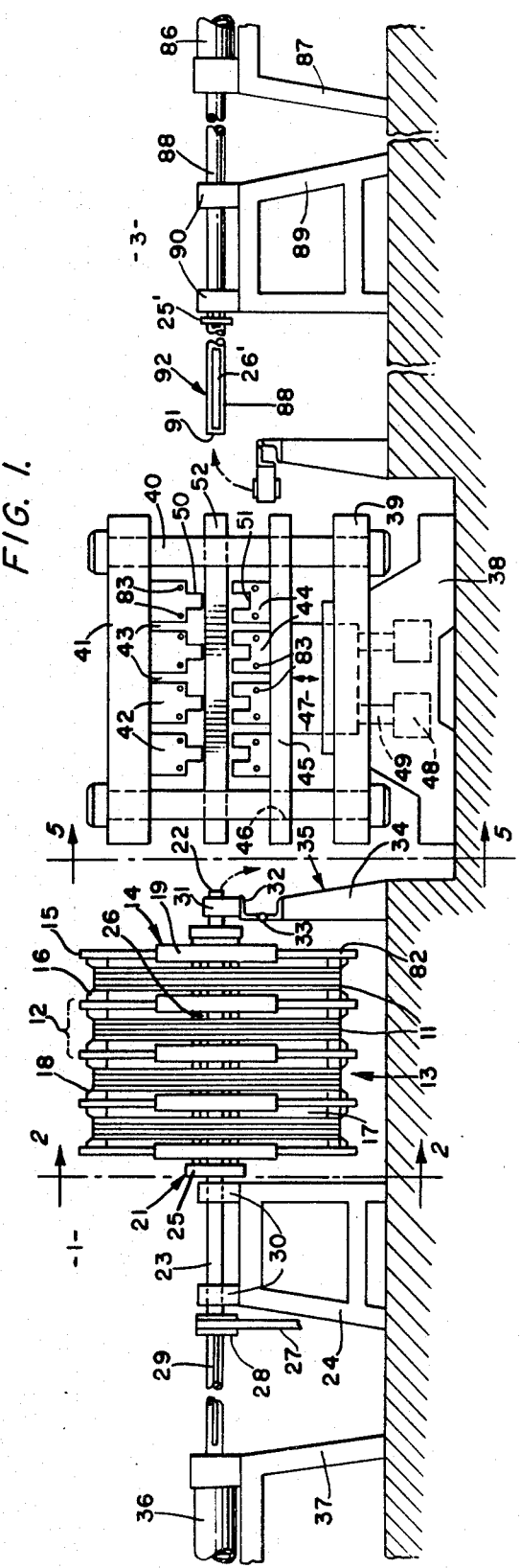
FIG. 1 is a side elevation of a molding apparatus according to the present invention.
Figure 2:
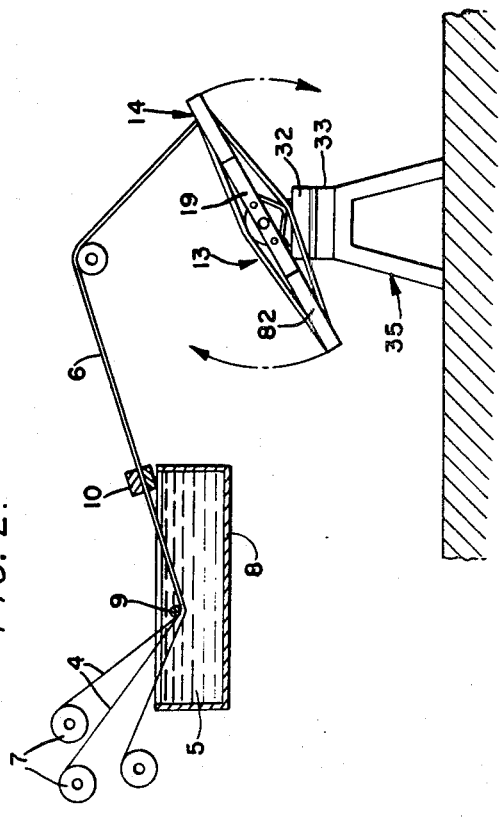
FIG. 2 is an end elevation taken along the line 2—2 of FIG. 1 and illustrating winding of the frame assembly.

Referring now to the drawings, particularly FIG. 1, the present invention will be seen to comprise three principal components namely, a winding and loading station 1, a molding or press station 2 and a removal station 3, all aligned along a common longitudinal axis. The raw material from which desired parts may be molded by the invention comprises any suitable reinforcement material such as glass fibers or strands 4 and which are impregnated with an appropriate resin 5 to produce an indefinite length of impregnated strand 6. These strands may be formed as shown in FIG. 2 of the drawings wherein it will be seen that a plurality of individual reels 7 containing the reinforcing fiber deliver the separate strands 4 into a resin bath 5 contained in a tank. A suitable guide member 9 associated with the tank gathers the required number of strands which subsequently exit from the resin bath and pass through a metering element 10 serving to wipe off excess resin from the impregnated strands 6.

It will be understood that one or more impregnated strands 6 may be simultaneously drawn from a single tank 8 such that a plurality of these strands 6 may be simultaneously produced. In any case, the strands 6 issuing from the tank 8 are wound to form a separate bundle 11 of these strands 6 upon each section 12 of a multi-section frame assembly generally designated 13.

Figure 3:
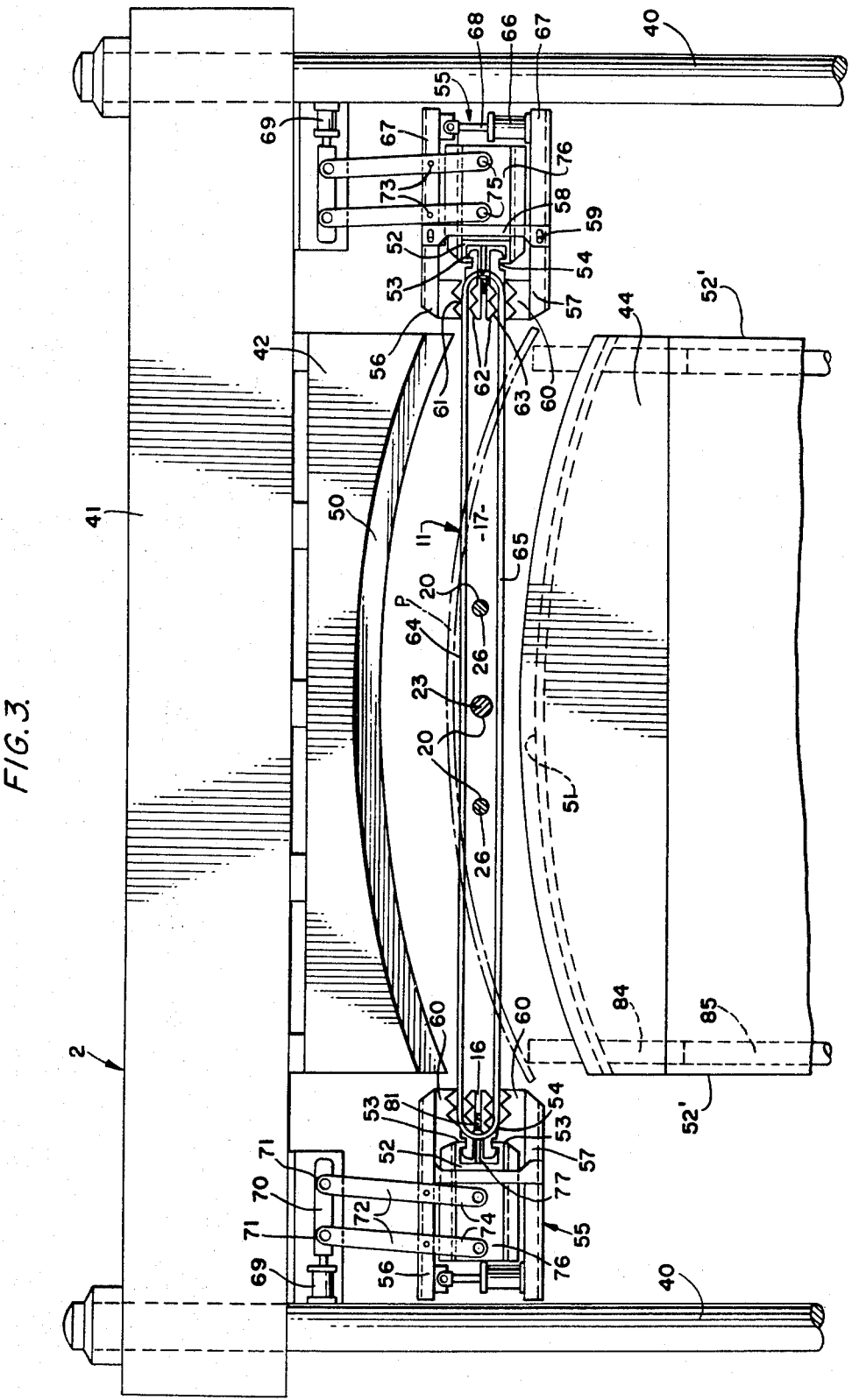
FIG. 3 is an enlarged end elevation of the molding and curing station of FIG. 1.

The unitary frame assembly includes a substantially planar mechanism comprising a plurality of parallel, laterally spaced apart frame side arms 14 joined to one another adjacent both their ends 15 by means of an end plate 16. A clear opening 17 is formed between each pair of spaced apart side arms 14 and end plates 16 and the area including each pair of spaced apart side arms defines a single, individual frame section 12. As shown most clearly in FIG. 1, the outer edge of each end plate 16 is recessed as at 18 to define a cavity for the reception of the desired number of convolutions of the impregnated strand 6 which is wound thereabout. The frame side arms 14 are provided with a medial portion 19 each of which is provided with a plurality of spaced apart and aligned openings 20 as shown in FIG. 3 of the drawings.

The aforedescribed frame assembly 13 is adapted to be supported upon a frame carrier 21 which carrier is fixedly secured adjacent the free end 22 of an axially disposed rod 23 supported by a fixed loading stand 24. The frame carrier 21 includes a hub 25 fixed relative to rod 23 and from which forwardly extend a pair of shafts 26-26 adapted to be slidably inserted within the two outer holes 20 of the frame assembly side arms 14, while the intermediate end 22 of the rod 23 is concurrently inserted within the central hole 20.

With the frame assembly 13 thusly supported upon the rod 23 and its carrier it will be appreciated that each of the frame sections 12 may be wound with a continuous length of the impregnated strand 6 until the desired bundle 11 configuration is achieved thereupon. This winding action may be accomplished by any suitable arrangement such as shown in FIGS. 1 and 2, wherein an appropriately driven belt 27 is sheaved about the pulley 28 which is keyed to the rod 23 as by the key 29. The rod 23 is fixed against radial displacement by means of a pair of rod mounts 30 carried by the loading stand 24 as well as by the rod mount 31 adapted to engage the distal portion 22 of the rod. This latter rod mount 31 is carried by a pivotal support 32 pivoted as at 33 to the fixed base 34 of a shiftable loading stand 35.

The frame assembly is considered ready for the subsequent molding operation following rotation of the rod 23 and affixed carrier 21 a sufficient number of times by means of the drive belt 27 in order to deposit the necessary number of parallel convolutions of the impregnated strand 6 upon each of the frame sections 12 in order to provide the necessary bulk of material to achieve the desired molded part. Thereafter, the wound frame assembly 13 as shown in the left hand portion of FIG. 1 of the drawings, is rotated within the mounts 30 and 31 until disposed in a horizontal plane at which point the end-most mount 31 is pivoted about the point 33 to a horizontal or lowered position away from the end 22 of the rod 23. The loaded or wound frame assembly 13 is then ready to be advanced into the next adjacent molding station 2 and this is most readily achieved by the actuation of a double-acting cylinder 36 joined to the rod 23 and fixedly mounted upon a power cylinder stand 37. The aforementioned pulley 28 being keyed longitudinally with respect to the rod 23 allows of this axial reciprocation of the rod without displacing the position of the pulley 28.

Figure 4:
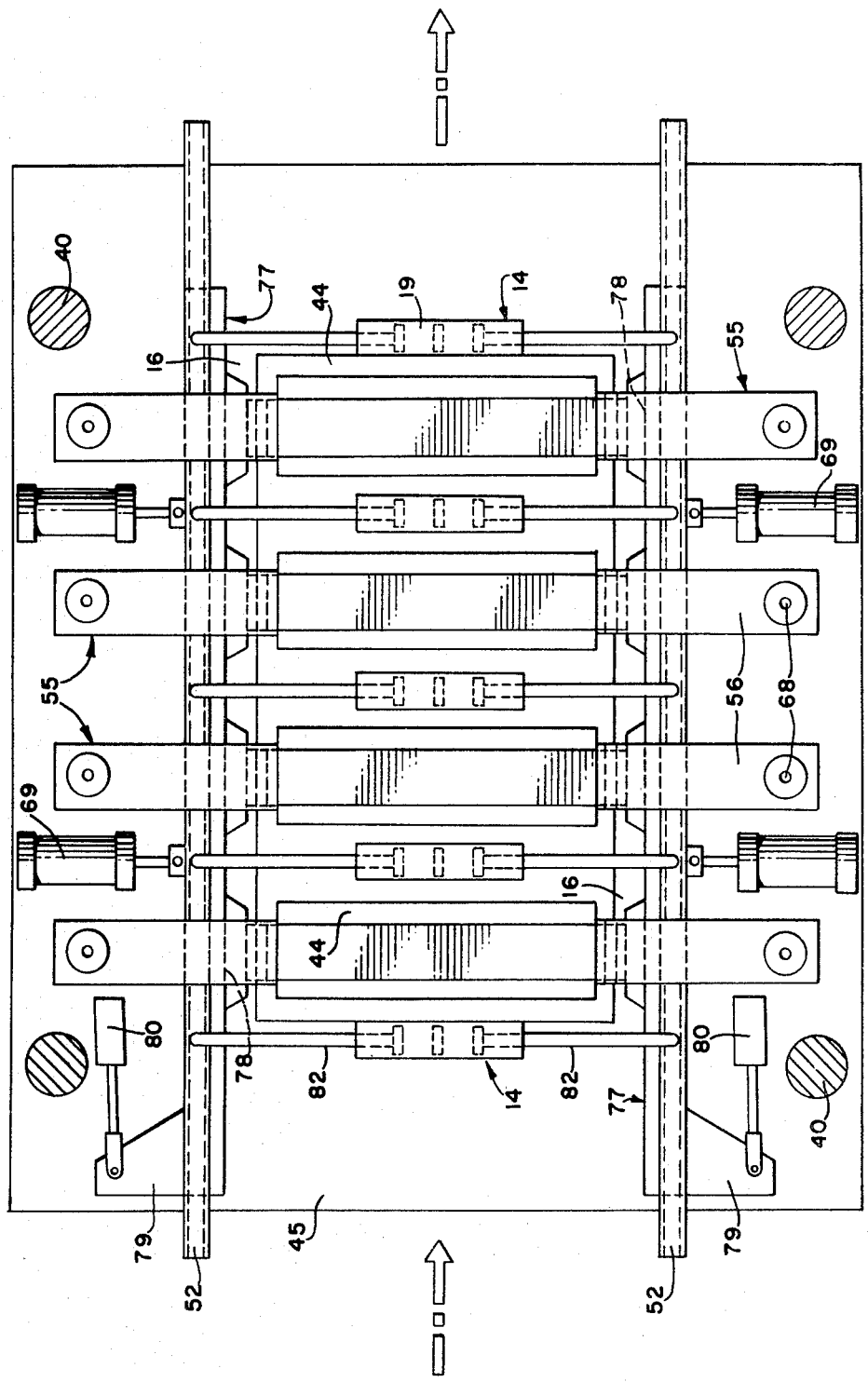
FIG. 4 is a horizontal sectional view taken between the opened mold sectiosn of FIG. 3.
Figure 6:
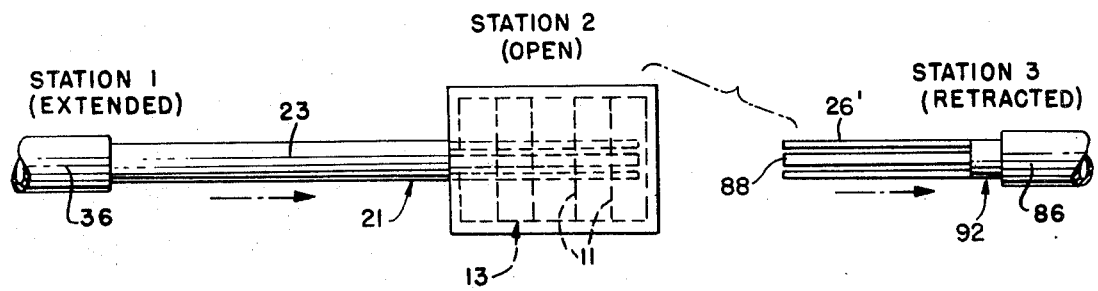
FIGS. 6-9 are diagrammatic top plan views illustrating the sequence of operation of the three principal stations of the apparatus.
Figure 7:
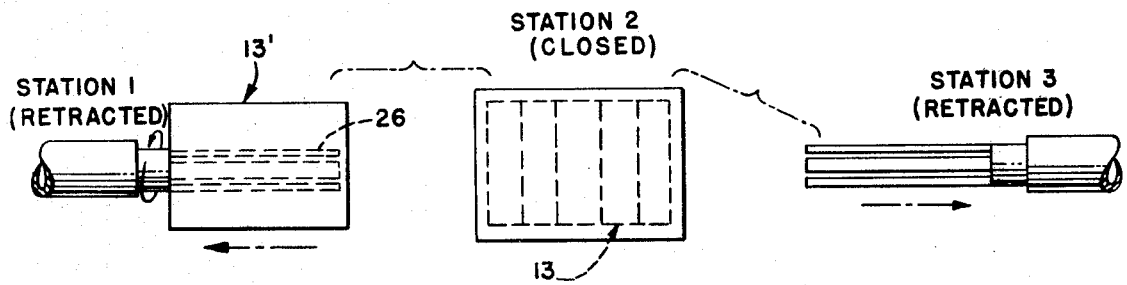
Figure 8:
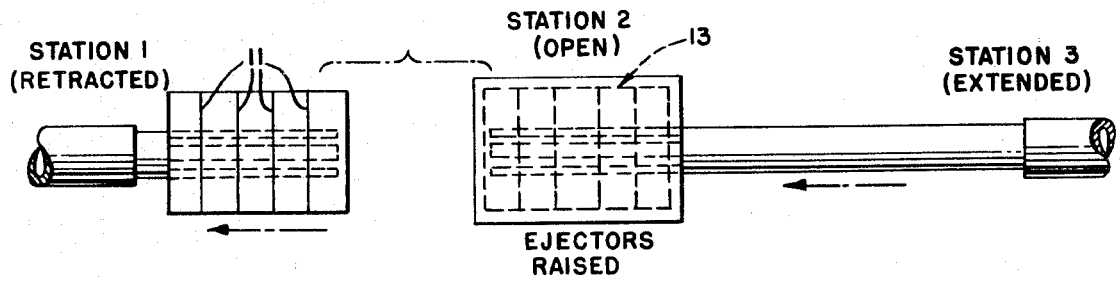
Figure 9:
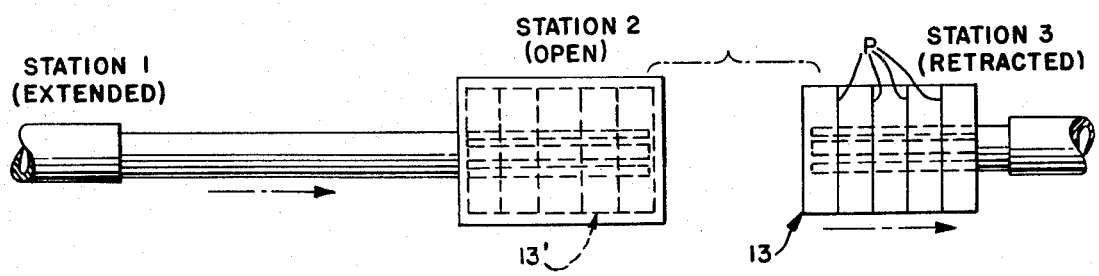

The molding station 2 is generally illustrated in the medial portion of FIG. 1 of the drawings, while associated guiding, supporting and clamping components are shown more clearly in FIGS. 3 and 4. The molding station includes a base 38 upon which is disposed a fixed bottom support 39 having a plurality of upstanding corner posts 40 projecting thereabove. These posts support at their upper ends a fixed top 41 beneath which are mounted a plurality of stationary, upper mold sections 42 which will be seen to be laterally spaced from one another as at 43 and which are disposed with their longitudinal or major axes extending transversely to the longitudinal axis of the loading station rod 23. A similar number of shiftable, lower mold sections 44 are disposed immediately beneath the upper mold sections 42 and are mounted upon a vertically displaceable mold section platform 45 having bores 46 slidably engaging each of the stationary posts 40. Vertical movement is imparted to the lowermost sections 44 and the platform 45 by means of a medially disposed piston 47 abutting the undersurface of the platform 45 and which is selectively displaced by means of a suitable number of double-acting cylinders 48 each having a piston rod 49. The uppermost sections 42 are shown with downwardly extending projections defining a male mold surface 50 which cooperates with the mating female mold surfaces or cavities 51 provided in the opposed lower mold sections 44. Naturally, these cooperating surfaces are configured to form the desired part intended to be produced by the subject apparatus.

When a wound frame assembly 13 is advanced from the winding and loading station 1 by means of actuation of the power cylinder 36, the opposite ends 15—15 of the frame assembly 13 are guided into a precise position between the opened mold sections of the molding station 2 by means of a pair of frame channels 52—52 mounted within the molding station at an elevation between the opened mold sections as shown in FIG. 1 and disposed laterally beyond the end faces 52' of the mold sections as shown in FIG. 3. Each frame channel 52 is provided with inturned flanges 53 adapted to engage a slightly larger groove 54 formed adjacent the ends 15 of each frame side arm 14.

When disposed within the frame channels 52, and properly positioned so that the frame section openings 17 are oriented between the opposed mold sections 42 and 44, a frame support and material clamp assembly, generally designated 55, is actuated opposite each end of the frame assembly 13. As shown in FIG. 3 of the drawings, each frame support and material clamp assembly 55 includes upper and lower clamp arms 56 and 57 respectively medially joined together by means of pairs of pivot links 58 having a hinge pin 59 at each end thereof. The inner end of each clamp arm 56 and 57 is provided with an external jaw 60 on their opposed faces with each jaw having teeth 61 transversely disposed with respect to the strands of the bundles 11 therebetween.

The referenced external jaws 60—60 are intended to cooperate with internal or intermediate frame jaws 62—62 provided on opposite surfaces of the end plates 16 at the two ends of the frame assembly 13. As shown in FIG. 3 of the drawings, these frame jaws 62 are provided with teeth 63 mating with the teeth 61 of the clamp arm external jaws 60. When the frame assembly has been inserted within the two frame channels 52—52 the impregnated strands 6 forming each bundle 11 about each of the frame sections 12 will comprise an upper segment 64 spaced from a lower segment 65 and each spanning the vertically disposed opening 17 between the two opposite jaw-equipped end plates 16.

The thus disposed bundles 11 are firmly secured in the position as shown in FIG. 3 by the actuation of the two clamp arms 56 and 57 at both ends of the frame assembly. This action is achieved by regulating the operation of a material clamp cylinder 66 spanning the outer ends 67 of the clamp arms 56-57. From a review of FIG. 3 of the drawings, it will be apparent that upon extension of the cylinder piston rod 68, the two clamp arms will be pivoted about the hinge pins 59 as the two clamp arm jaws 60—60 are urged toward one another with the teeth 61 thereof contacting the two bundle segments 64-65 and firmly gripping same as the strands thereof are urged into the frame assembly jaws 62. From the above it will be appreciated that the ends of all of the upper and lower segments 64-65 will in effect be pinched between the opposed jaws 60-62 and thus the strands forming each bundle 11 will be fixedly positioned between the opened mold sections 42, 44.

Before the molding operation can proceed it is necessary to separate the respective upper segments 64 from the lower segments 65 otherwise it will follow that the frame assembly would become entrapped within the molded parts in view of the loop portions of the strands at the two ends of the frame assembly. Accordingly, the two opposed frame channels 52 are advanced toward one another a slight degree by actuation of a plurality of frame cylinders 69. From FIGS. 3 and 4 of the drawings, it will be observed that operation of the frame cylinders 69 produces a reciprocating displacement of the attached control shaft 70, which action displaces the first ends 71 of a pair of links 72 having their medial portions pivoted as at 73. This displacement is translated as an opposite horizontal movement of the second ends 74 of the links 72 and these second ends are pivotally connected as at 75 to a slide block 76 joined to the outer face of each of the frame channels 52. Each of these frame channels carries a longitudinally extending cutting blade 77 having a separate serrated cutting edge 78 juxtaposed the end plate 16 of each frame assembly section 12 as will be seen most clearly in FIG. 4 of the drawings. These two blades include an offset actuating arm 79 joined to an appropriate power cylinder 80 such that upon initiation, the cutting blade 77 is oscillated.

After closing of the clamp arm jaws 60, and inward advancement of the two frame channels 52, the power cylinders 80 are actuated to oscillate the cutting blades 77 with the individual cutting edges 78 severing all of the adjacent impregnated strands 6. In order to preserve the serrated cutting edges 78 and to present appropriate anvil or back-up means for the strands to be cut, each end plate 16 of the frame assembly is slotted as shown in FIG. 3 and provided therein with a rubber insert or seat 81.

Following severing of the upper and lower segments 64 and 65, pressure within the frame cylinder 69 is released and the inward force applied by the two frame channels 52 is relaxed after which the loading station cylinder 36 is operated to retract the central rod 23 and the two outer shafts 25 from the medial portion 19 of the plurality of frame side arms 14. Alternatively, the frame carrier 21 may be retracted at any other point if desired.

This may occur at any time following securing of the frame assembly 13 between the opposed frame guide channels 52—52 depending upon the specific product involved.

While the subsequent operation of the components of the molding station 2 take place, it will be understood that a second, empty frame assembly 13 may be mounted upon the retracted frame carrier 21 and the previously described winding operation may be applied to that empty frame assembly so that a wound frame assembly will be ready for immediate advancement into the molding station 2 following completion of the molding and curing operation upon the bundles 11 already in the molding station.

Returning to the severed segments 64–65 now located in the molding station 2, it will be understood that these are still disposed in a vertically spaced apart manner due to the frame end plates 16 and attached jaws 62 which are disposed intermediate the ends of these upper and lower segments. Quite obviously, upon the closing of the mold sections 42 and 44 it would follow that unwanted lateral distortion of the strands 6 of the two segments could occur as these spaced apart upper and lower strands are vertically displaced, thus destroying the parallel relationship therebetween and compromising the composition of the subsequently molded part. Accordingly, means are provided to relax the tension of the stretched strands of the spaced apart upper and lower segments and to offer a more homogeneous single bundle within each opening 17 immediately prior to closing of the mold sections. As noted in FIG. 1 of the drawings, each frame section is laterally bounded by the side arms 14 which include pairs of outer sections 82 inserted within the medial portions 19. Appropriate spring means (not shown) within each medial portion 19 normally constantly applies an outward pressure to the telescopic inner ends of each outer section 82 to maintain the frame assembly in the expanded winding and loading position such as shown in FIG. 1. During the molding operation, as the piston 47 is urged upwardly to force the lower mold sections 44 toward the upper mold sections 42, the frame channels 52—52 are advanced inwardly by actuation of the frame cylinder 69 and this action applies a compressive force to the ends 15 of the side arm outer sections 82 to slightly collapse the overall extent of the frame assembly and relax the tension upon the strands forming both the upper and lower segments thereof. With the strands of all of the bundles 11 properly extended within the individual openings 17 between each adjacent pair of frame side arms 14, the lowermost mold sections 44 continue their upward movement with the female mold surfaces or cavities 51 capturing all of the strands of each bundle after which the respective male mold surfaces 50 enter the cavities 51 to form the required part configuration.

In the case of bundles comprising thermo-setting resin impregnated fibers, suitable heating elements 83 associated with the mold sections hardens or cures the material within the molds to the required hot strength. Quite obviously, if the bundles 11 incorporate thermo-plastic resins then the elements 83 will comprise appropriate cooling means in order to chill or freeze the product. In any case, the mold sections remain closed for the required time to complete formation of the parts therein, it being understood that the cooperating closed mold section surfaces are entirely within the respective openings 17 of each frame section 12 while the plurality of frame side arms 14 are disposed within the space 43 intermediate the plurality of cooperating mold sections.

Upon opening of the mold section platform 45, part ejectors 84 located beneath the lower mold section cavities 51 and adjacent the end faces 52 thereof, are vertically displaced by means of cooperating ejector actuators 85 in order to raise the molded parts into the openings 17 of the frame assembly 13. As shown in FIG. 3, the mold sections are constructed to provide a molded part having a curved configuration with the highest point thereof being medially located with respect to the mold sections and accordingly, it will be appreciated that upon elevation of the ejectors 84—84 this medial portion of the parts will be raised to a point above the horizontal plane of the frame assembly end plates 16—16 as depicted in this drawing figure by the dotted line illustration of the molded part P.

Turning now to the removal station 3, the molded parts as well as the frame assembly 13 are removed from the molding station 2 by the actuation of a double-acting cylinder 86 mounted upon a power cylinder stand 87 which causes extension of the rod 88 that is slidably mounted upon a fixed removal stand 89 such as by the rod mounts 90. The end 91 of the removal rod 90 is equipped with a retract carrier 92 which is similar to the frame carrier 21 of the loading station 1. The three shafts 25' of the retract carrier 92 are maintained in a fixed horizontal plane such that upon extension of the rod 88 these shafts enter the molding station 2 and are guided into the three holes 20 in the medial portions 19 of the frame assembly 13. Following extension of the retract carrier 92 into the molding station, the part ejectors 84 are lowered thereby leaving the plurality of parts disposed atop the plurality of shafts 25' spanning the openings 17 of the frame assembly. At this point, the frame cylinders 69 are actuated to relax or outwardly displace the frame channels 52 such that upon retraction of the removal station rod 88 it will be seen that the frame assembly 13 as well as all of the molded parts therein are removed from the molding station 2. Immediately upon this retraction of molded parts and frame assembly from the molding station it will be understood that the winding and loading station 1 may be actuated to deliver another already wound frame assembly into the molding station.

Figure 5:
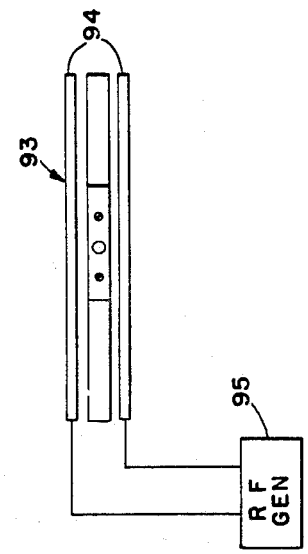
FIG. 5 is a diagrammatic end elevation taken along the line 5—5 of FIG. 1 and illustrating a pre-heating apparatus insertable between the first two stations of the apparatus.

It will be appreciated that due to the very nature of thermo-setting resins the time required to accomplish the heat curing of the bundles 11 within the molding station 2 will amount to a far greater length of time than the time necessary to carry out the entire remaining portion of the process described herein. To increase the rate of formation of molded products per hour it will be obvious that any means serving to accelerate the curing action will substantially increase the overall production rate. Accordingly, it is proposed to include means intermediate the winding and loading station 1 and the molding and curing station 2 to pre-heat the bundles 11 wound upon the frame assembly 13. FIG. 5 of the drawings illustrates appropriate non-contact pre-heating means 93 which may be positioned between stations 1 and 2 and which includes a pair of spaced-apart radiation plates 94—94 between which the wound frame assembly 13 passes. By joining a radio frequency (RF) generator 95 to the plates 94 and supplying a suitable RF field therebetween, such as 100 megahertz, it will be understood that the bundles 11 will be preheated a significant amount such that much less time will be required for the subsequent curing operation in the molding station 2.

Experience has shown that with the employment of a suitable pre-heating operation, the subsequent curing time is reduced more than one-third while the time for a complete cycle of the overall apparatus is reduced to less than one-half that required when the bundles are not pre-heated.

The sequence of operations described herein will be further clarified upon a review of FIGS. 6–9 of the drawings wherein the relative disposition of the three principal stations are depicted during the formation of a plurality of cured parts P. From these views the shuttle concept of the present improved process will be readily apparent with FIGS. 7 and 8 disclosing the preparation of a second frame assembly 13' concurrently with the curing of the bundles contained upon the first frame assembly 13 positioned within the molding station 2.

In view of alternative molding applications it will be beneficial to summarize various sequences of operation of the components in the molding station 3. The mechanism for regulating the advancement and retraction of the two opposed frame channels 52—52 and the closing and opening of the clamp arms 56-57 has already been described, together with the operation of the oscillating cutting blades 77. It should be appreciated that the exact sequence of operation of these various components may very according to the type or configuration of the part P being produced. If, unlike the illustration of the mold sections in FIG. 3, the longitudinal extent of the cooperating mold surfaces 50-51 are straight or flat in order to produce a non-longitudinally curved product, then it will be obvious that as the mold sections close, there will be no longitudinal deformation of the upper and lower bundle segments 64-65 as in the case of curved mold sections. Accordingly, the sequence of operation will be as follows: close mold sections; actuate cutting blades 77 to sever bundles; open clamp arms 56,60 and retract cutting blades. Alternatively, in the case of a curved product as illustrated in the moll configuration of FIG. 3, the sequence of operations is as follows: close mold sections; compress or collapse the longitudinal extent of the frame assembly as mold sections close to relax segments 64-65 of the wound bundle 11; actuate cutting blades 77; open clamp arms 56,60 and retract cutting blades. Obviously, further variations of the above sequences may be employed depending upon other parameters such as composition of the resinous material being utilized and the bulk or mass of the strands forming the bundles 11.

With the foregoing in mind, it will be appreciated that an improved method and apparatus is set forth enabling the continuous, sequential operation of a plurality of stations with a plurality of parts being simultaneously molded at one station while a first station is preparing molding material in a condition ready to be inserted into a molding station immediately following the curing of the first admitted molding material into the molding station.

I claim:

1. The method of molding parts comprising the steps of: winding a curable resin-impregnated strand about opposite end plates of a frame assembly to provide a strand bundle spanning an opening in said frame assembly, shifting said wound frame assembly into a molding station to dispose said bundle in a spanning manner between open spaced-apart mold sections therein, said molding station including opposed guide means, while engaging opposite ends of said frame assembly with said opposed guide means actuating cutting means adjacent said guide means to sever said bundle strands juxtaposed said frame assembly end plates, closing said mold sections to mold said bundle therebetween with at least one said mold section passing through said frame assembly opening curing said resin thereby forming a molded part, opening said mold sections after molding of said part, and retracting said frame assembly and the molded part from said molding station.

2. The method according to claim 1 wherein, said strand is impregnated with a thermo-setting resin, and including the step of subjecting said bundle on said frame assembly to pre-heating treatment prior to shifting of said frame assembly into said molding station.

3. The method according to claim 1 wherein, said molding station includes a pair of displaceable opposed clamp arms adjacent each said guide means, and including the step of closing said clamp arms to engage said bundle strands adjacent said frame assembly end plates.

4. The method according to claim 1 including winding a bundle about a second frame assembly following shifting of said first frame assembly into said molding station.

5. The method according to claim 1 wherein, said step of actuating cutting means includes, reciprocating a pair of opposed longitudinally extending cutting blades.

6. The method according to claim 1 wherein, a winding molding station and includes a longitudinally shiftable carrier extendible to a point between said open mold sections, said frame assembly provided with spaced side arms forming with said end plates said opening, said carrier engageable with said side arms to support said frame assembly, and including the steps of initially rotating said carrier to wind and form said bundle on said frame assembly, and displacing said carrier axially to shift said frame assembly into said molding station.

7. The method according to claim 6 wherein, a removal station is disposed adjacent an opposite second end of said molding station and includes a longitudinally shiftable carrier extendible to a point between said open mold sections, and including the step of displacing said removal station carrier axially to engage said frame assembly side walls prior to said retraction of said frame assembly and part from said molding station.

8. The method according to claim 1 including, displacing inwardly said opposed guide means to rigidly retain said bundle-containing frame assembly within said molding station.

9. The method according to claim 8 wherein, said frame assembly includes collapsible side arms joined to said end plates and normally in an extended position, and including the step of displacing inwardly said guide means a distance sufficient to collapse said side arms and relax said bundle strand.

* * * * *